United States Patent
Talwar et al.

(10) Patent No.: US 9,830,925 B2
(45) Date of Patent: Nov. 28, 2017

(54) SELECTIVE NOISE SUPPRESSION DURING AUTOMATIC SPEECH RECOGNITION

(71) Applicant: GM Global Technology Operations LLC, Detroit, MI (US)

(72) Inventors: Gaurav Talwar, Novi, MI (US); Xufang Zhao, III, Windsor (CA); Robert D. Sims, III, Milford, MI (US); Md Foezur Rahman Chowdhury, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 14/520,974

(22) Filed: Oct. 22, 2014

(65) Prior Publication Data

US 2016/0118042 A1 Apr. 28, 2016

(51) Int. Cl.
| | |
|---|---|
| G01L 15/00 | (2006.01) |
| G10L 21/0208 | (2013.01) |
| G10L 21/00 | (2013.01) |
| G10K 11/16 | (2006.01) |
| H04R 5/00 | (2006.01) |
| G10L 15/20 | (2006.01) |
| G10L 25/93 | (2013.01) |

(52) U.S. Cl.
CPC .......... *G10L 21/0208* (2013.01); *G10L 15/20* (2013.01); *G10L 25/93* (2013.01)

(58) Field of Classification Search
USPC ....... 704/216, 228, 226, 243, 233, 278, 210, 704/214; 381/71.6, 28
See application file for complete search history.

(56) References Cited

U.S. PATENT DOCUMENTS

| | | | | |
|---|---|---|---|---|
| 2004/0133421 | A1* | 7/2004 | Burnett | H04R 1/46 704/215 |
| 2006/0053003 | A1* | 3/2006 | Suzuki | G10L 25/78 704/216 |
| 2009/0192803 | A1* | 7/2009 | Nagaraja | G10L 19/012 704/278 |
| 2011/0299695 | A1* | 12/2011 | Nicholson | G10K 11/1782 381/71.6 |
| 2012/0128164 | A1* | 5/2012 | Blamey | H04R 5/04 381/28 |
| 2012/0191450 | A1* | 7/2012 | Pinson | G10L 21/0208 704/233 |

(Continued)

OTHER PUBLICATIONS

Algabri, Mohammed, et al. "Voice and Unvoiced Classification Using Fuzzy Logic." Int'l Conf. IP, Comp. Vision, and Pattern Recognition, 2015, DOI: 10.13140/RG.2.1.1008.5607 pp. 416-420.

(Continued)

*Primary Examiner* — Neeraj Sharma
(74) *Attorney, Agent, or Firm* — Christopher DeVries; Reising Ethington P.C.

(57) ABSTRACT

An automatic speech recognition engine and a method of using the engine is described. The method pertains to front-end processing an audio signal and includes the steps of: identifying a plurality of voiced-frames of the audio signal; determining that one or more of the plurality of voiced-frames have a signal-to-noise (SNR) value greater than a first predetermined threshold; and based on the determination, bypassing noise suppression for the one or more of the plurality of voiced-frames.

14 Claims, 5 Drawing Sheets

(56) References Cited

U.S. PATENT DOCUMENTS

| | | | |
|---|---|---|---|
| 2012/0209603 A1* | 8/2012 | Jing | G10L 21/0364 |
| | | | 704/233 |
| 2014/0067388 A1* | 3/2014 | Manikandan | G10L 15/20 |
| | | | 704/233 |
| 2014/0214414 A1* | 7/2014 | Poliak | G10L 21/0208 |
| | | | 704/228 |
| 2014/0278386 A1* | 9/2014 | Konchitsky | G10K 11/002 |
| | | | 704/226 |
| 2015/0106087 A1* | 4/2015 | Newman | G10L 25/78 |
| | | | 704/233 |
| 2015/0262576 A1* | 9/2015 | Oda | G10L 21/0216 |
| | | | 704/233 |
| 2015/0325251 A1* | 11/2015 | Dusan | G10L 21/0208 |
| | | | 704/226 |
| 2016/0071529 A1* | 3/2016 | Kato | G10L 25/84 |
| | | | 704/233 |
| 2016/0098986 A1* | 4/2016 | Hofer | G10L 15/083 |
| | | | 704/243 |

OTHER PUBLICATIONS

"Voice (phonetics)." Wikipedia. Wikimedia Foundation, Mar. 27, 2017. Web. Mar. 27, 2017. <https://en.wikipedia.org/wiki/Voice_(phonetics)>, 3 pages.

* cited by examiner

TABLE I

| Test Cases | Noise Reduction | Dynamic Noise Reduction | Tonal Noise Reduction | LFE Reconstruction | Send Fixed Gain |
|---|---|---|---|---|---|
| Configuration_Case04 | 4dB | Off | Off | Off | 0 |
| Configuration_Case06 | 4dB | Off | Off | Off | 9 |
| Configuration_Case13 | 4dB | On | On | On | 0 |
| Configuration_Case15 | 4dB | On | On | On | 9 |
| Configuration_Case16 | 6dB | Off | Off | Off | 0 |
| Configuration_Case18 | 6dB | Off | Off | Off | 9 |
| Configuration_Case25 | 6dB | On | On | On | 0 |
| Configuration_Case27 | 6dB | On | On | On | 9 |

*Figure 5*

TABLE II

| Noise Reduction ASR Analysis | Overall Accuracy | Idle_LF | City_80pct | Highway_LF | Highway_HF |
|---|---|---|---|---|---|
| Baseline | 78.00% | 88.30% | 85.30% | 81.20% | 56.60% |
| Configuration_Case04 | 76.90% | 88.40% | 84.70% | 80.90% | 53.60% |
| Configuration_Case06 | 77.00% | 88.50% | 84.90% | 80.80% | 53.60% |
| Configuration_Case13 | 77.20% | 88.30% | 85.20% | 80.40% | 54.70% |
| Configuration_Case15 | 77.10% | 88.00% | 84.90% | 80.30% | 54.90% |
| Configuration_Case16 | 77.60% | 88.40% | 85.10% | 81.10% | 55.60% |
| Configuration_Case18 | 77.50% | 88.10% | 84.70% | 81.20% | 55.60% |
| Configuration_Case25 | 77.70% | 88.50% | 85.10% | 81.20% | 56.00% |
| Configuration_Case27 | 77.80% | 88.50% | 85.20% | 81.50% | 56.00% |

*Figure 6*

TABLE III

| Echo Canceller ASR Analysis | Overall Accuracy | Idle_LF | City_80pct | Highway_LF | Highway_HF |
|---|---|---|---|---|---|
| Baseline (no barge-in voice command, no echo canceller) | 78.00% | 88.30% | 85.30% | 81.20% | 56.60% |
| Barge-in with QNX echo canceller | 75.70% | 86.90% | 83.10% | 79.20% | 53.00% |

*Figure 7*

SELECTIVE NOISE SUPPRESSION DURING AUTOMATIC SPEECH RECOGNITION

TECHNICAL FIELD

The present invention relates to selective noise suppression during automatic speech recognition.

BACKGROUND

Hands-free computing devices have become increasingly popular; this is especially true in vehicles where voice command/control may be desirable—enabling control over vehicle function(s) using the driver's voice. A voice control system may accept the driver's speech as input, interprets the speech, and makes a logical decision (e.g., executing control over a vehicle function) based on the interpretation of the speech. When the driver is able to utilize a voice command mode, driver distraction during vehicle operation can be minimized and may be prevent distraction-related accidents.

Of course, where the driver attempts to command the vehicle using his/her voice and the vehicle is unresponsive (or responds incorrectly), this may cause driver frustration and ultimately greater distraction than if the driver had merely manually executed the command without attempting voice control.

SUMMARY

It is therefore an object of the invention to improve the accuracy of automated speech processing, particularly in a vehicle environment.

According to an embodiment of the invention, there is provided a method of front-end processing an audio signal. The method includes the steps of: identifying a plurality of voiced-frames of the audio signal; determining that one or more of the plurality of voiced-frames have a signal-to-noise (SNR) value greater than a first predetermined threshold; and based on the determination, bypassing noise suppression for the one or more of the plurality of voiced-frames.

According to another embodiment of the invention, there is provided a method of preprocessing an audio signal. The method includes the steps of: identifying a plurality of speech-dominant frames from an audio signal received by an automatic speech recognition (ASR) engine; classifying the plurality of speech-dominant frames into voiced-frames and unvoiced-frames; for each of the voiced-frames, determining whether the voiced-frame's signal-to-noise ratio (SNR) is greater than a predetermined threshold ($T_{v1}$); and for each of the voiced-frames having an SNR greater than the predetermined threshold ($T_{v1}$), providing the voiced-frames for downstream processing without noise suppression, and for each of the voiced-frames having an SNR less than or equal to the predetermined threshold ($T_{v1}$), providing the voiced-frames for downstream processing after performing preprocessing noise suppression on the voiced-frames.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method(s) described below generally pertain to improving speech recognition accuracy. The method(s) describe selectively and intelligently removing noise suppression during the front-end or preprocessing of the voice signal to achieve this improved accuracy. As will be described in greater detail below, an automatic speech recognition (ASR) process may include a preprocessing stage and a downstream processing stage. The preprocessing stage generally may prepare a voice signal received amidst background noise for interpretation during the downstream processing stage. During preprocessing, one or more noise suppression techniques or algorithms may be applied to the speech frames of the voice signal to increase overall ASR accuracy—thereby providing the downstream processing stage a cleaner voice signal. However, it has been discovered that in some instances, this may introduce undesirable musical distortions into the downstream stage. These distortions are undesirable because the speech recognition system is designed on the basis of human speech perception model. Undesired changes in the speech amplitude can significantly impact the system's performance. The method(s) described herein illustrate that by selectively applying noise suppression to some of the speech frames and not to others, an improvement to ASR accuracy may be achieved.

The method(s) are illustrated in a vehicle environment. Such an environment suitably illustrates: (a) how a vehicle's ASR engine might receive voice commands (voice signals) from a vehicle user using a vehicle audio system; (b) process the voice command using the ASR engine in the vehicle; and (c) perform an action based on the processed voice command using a vehicle processing device. It should be appreciated that the configurations or embodiments of the ASR engine described herein may be used in any suitable application or environment and that the vehicle environment described below is merely an example.

Communications System—

Figure 1:
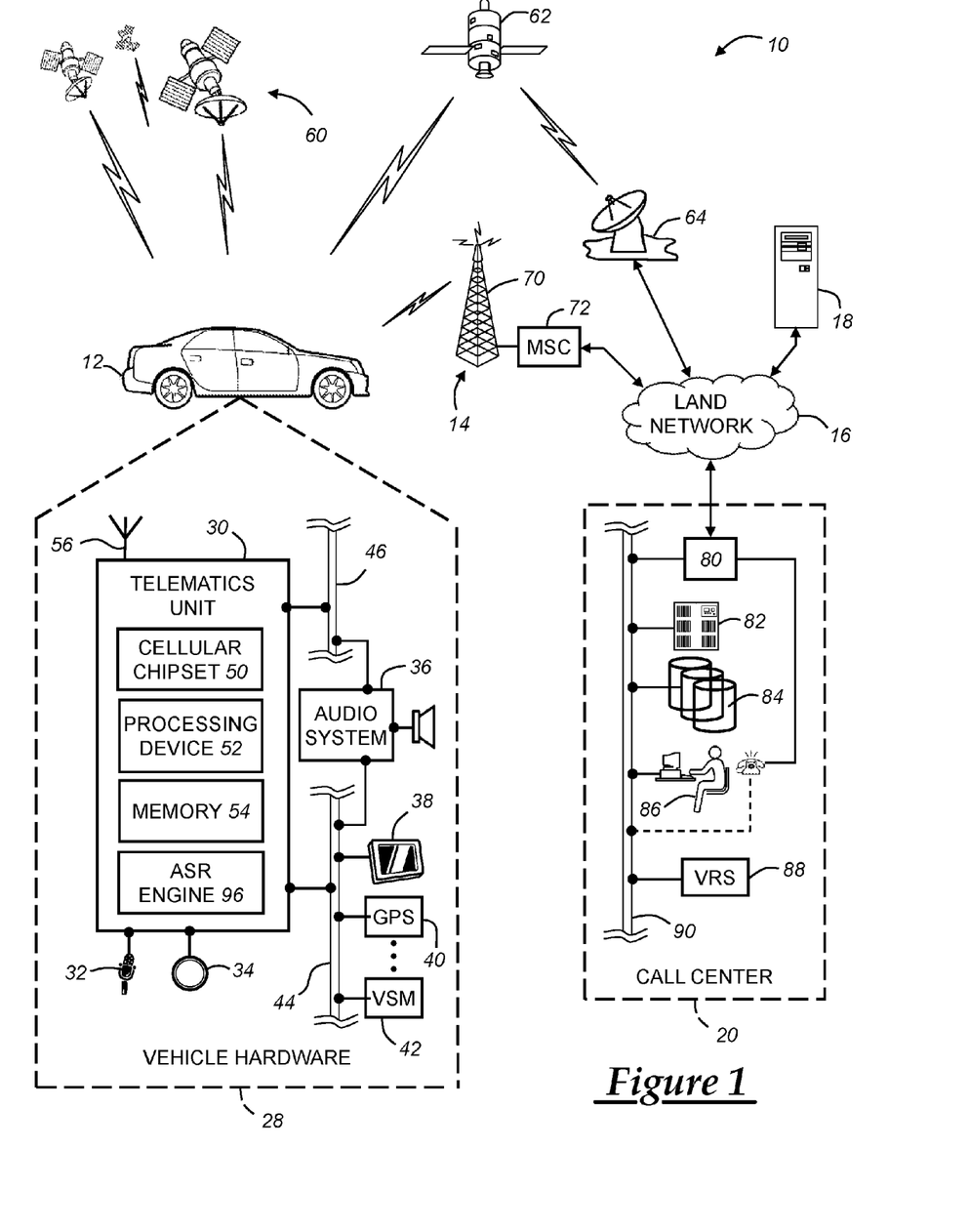
FIG. 1 is a block diagram depicting an embodiment of a communications system that is capable of utilizing the method disclosed herein.

Turning first to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering.

FIG. 1 illustrates that the telematics unit 30 also may include an automatic speech recognition (ASR) engine or module 96. The ASR engine may be any device configured to receive human speech or utterances and interpret the speech in a computer-readable format (or computer-interpretable format). The ASR engine 96 may be coupled to other electronic devices (e.g., via the buses 44, 46); thus, once the speech is interpreted by the ASR engine, the interpretation may be communicated as a command or control signal (e.g., to a control module or other device in the vehicle 12). It should be appreciated that while the ASR engine is shown as part of the telematics unit 30, this also is merely an example. The ASR engine could be a separate device or part of another vehicle system.

Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Further, it should be appreciated that at least part of the vehicle electronics 28 may be configured to operate with the ASR engine 96. For example, the audio system 36 may provide speech (e.g., a voice signal or input) to the ASR engine via microphone 32. In addition, one or more pushbuttons 34 may queue or ready the ASR engine to receive speech from a vehicle user. As used herein, the vehicle user may be an operator/driver of the vehicle 12, a vehicle passenger, or person within proximity of the vehicle 12. Moreover, the vehicle user does not need to have ownership of the vehicle 12 (e.g., the vehicle user may be an owner or a licensee).

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
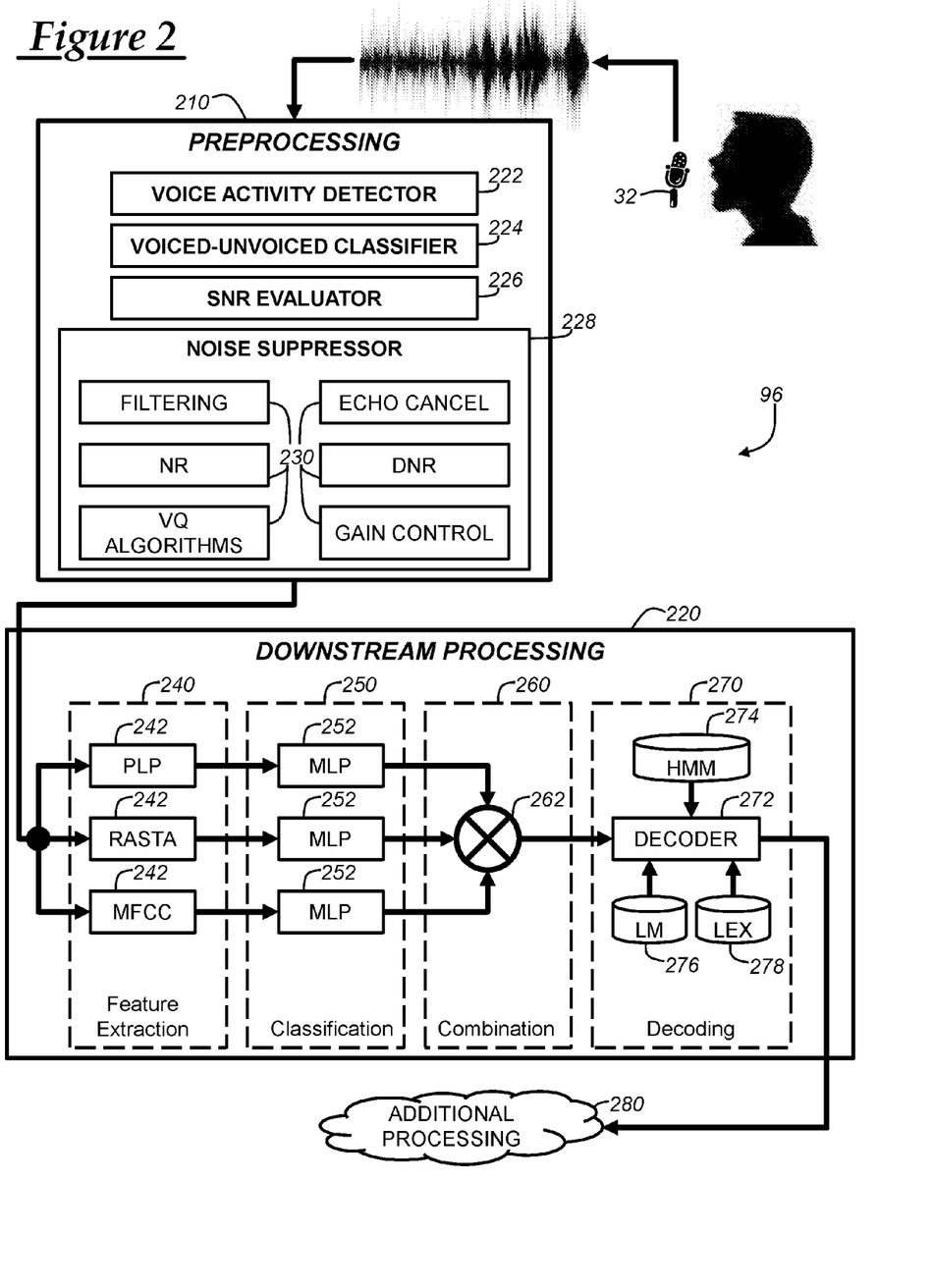
FIG. 2 is a schematic diagram illustrating a preprocessing stage (having a noise suppressor) and a downstream processing stage of an automatic speech recognition (ASR) engine.

Turning now to FIG. 2, there is shown a schematic diagram illustrating a vehicle user providing speech into microphone 32, a preprocessing stage 210, a downstream processing stage, and an additional processing stage 280. The preprocessing and downstream processing stages 210, 220 schematically illustrate one embodiment of the ASR engine 96; e.g., these stages may be configured within a single electronic device or module or separate devices/modules. Further, the stages 210, 220 may be implemented in software, firmware, hardware, or any combination thereof.

The preprocessing stage 210 may include a voice-activity detector 222, a voiced-unvoiced classifier 224, a signal-to-noise (SNR) evaluator 226, and a noise suppressor 228.

The voice-activity detector 222 may receive an incoming audio signal comprised of the user's utterance and noise via the microphone 32. The voice-activity detector then may determine a noise floor (e.g., an approximation of the background or baseline noise) and may determine the speech frames or speech-dominant frames associated with the user's utterance. The speech frames may include both voice(d) frames and unvoice(d) frames, as those terms are understood by skilled artisans. Further, the remaining frames may be nonspeech frames (e.g., silence frames).

The voiced-unvoiced classifier 224 may determine or classify each of the speech frames as either voiced or unvoiced speech frames. Such classification may be performed by various known techniques not limited to pitch and formant identification and analysis.

The SNR evaluator 226 may determine the relative signal strength of the classified speech frames. For example, a voiced or unvoiced speech frame may be compared against one or more predetermined threshold values to determine whether the speech frame is greater than a first predetermined threshold. As will be explained more below, in at least one embodiment, the same speech frame also may be compared against a second, third, etc. predetermined thresholds as well.

The noise suppressor 228 is shown having a toolbox of multiple suppressing tools 230. Tools 230 may be any suitable device or algorithm for minimizing, quashing, or suppressing noise in the speech frames. Nonlimiting examples of tools 230 include: filtering devices, noise reducers (NR), dynamic noise reducers (DNR), echo cancellers, voice quality (VQ) algorithms, and gain controller(s). The tools may be used singly or in combination—moreover, the tools may be used repetitively or iteratively, if desired.

Turning now to the downstream processing stage 220 of FIG. 2, there is shown a sequence of four sub-stages for interpreting the speech and nonspeech frames: a feature extraction sub-stage 240, a classification sub-stage 250, a combination sub-stage 260, and a decoding sub-stage 270. These are meant merely to illustrate downstream processing and are not intended to be limiting; e.g., more or less or even different sub-stages also are possible. The four sub-stages 240, 250, 260, 270 and the techniques for implementing such sub-stages are known. Nonlimiting examples of feature extraction used in sub-stage 240 include various tools 242 such as: linear predictive codes (LPC), perceptual linear prediction (PLP), Mel frequency cepstral coefficients (MFCC), and PLP-relative-spectra (PLP-RASTA). Nonlimiting examples of classification used in sub-stage 250 include various tools 252 such as: K-nearest neighbor (KNN), Parzen window, branch-and-bound (BnB), multilayer perceptrons (MLP), and dynamic time warping (DTW). The combination sub-stage 260 includes the combining or mixing the outputs of the classification sub-stage. And nonlimiting examples of decoding used in sub-stage 270 include use of a decoder 272 with various other tools; e.g., tools 274 (e.g., Hidden Markov Models (HMM), Bayesian networks, etc.), tools 276 (language modeling (LM)), tools 278 (lexicon (LEX)), or any combination thereof.

The additional processing 280 is illustrated generically. Processing 280 may include any post-processing of the speech and nonspeech frames. In one embodiment, step 280 may include acting upon the decoded speech and nonspeech frames; e.g., utilizing the interpreted information of the speech and nonspeech frames to execute a vehicle user's voice command. Thus, step 280 should be construed broadly to include sending an electrical signal to an appropriate device or module elsewhere in the vehicle 12 or other desirable actions associated with the user's speech.

FIG. 2 further illustrates a flow diagram beginning with receiving the user's utterance into the microphone 32. The utterance may be processed by the voice-activity detector 222, then the voiced-unvoiced classifier 224, and then the SNR evaluator 226. As will be explained below (FIG. 3), when the SNR evaluator determines that the SNR of a speech frame exceeds a predetermined threshold, that speech frame may bypass the noise suppressor 228. And speech frames with an SNR less than (or equal to) the threshold may undergo noise suppression using one or more tools 230 of the suppressor 228. In some instances, the nonspeech frames may also under noise suppression via suppressor 228. According to the diagram, the preprocessing stage 210 then concludes, and thereafter, the speech frames (and nonspeech frames) proceed to the downstream processing stage 220 and may pass through sub-stages 240, 250, 260, 270 in order to complete the interpretation of the utterance. Upon exiting the decoding sub-stage 270, the downstream processing stage ends, and the output may or may not be provided to the additional processing 280.

Figure 3:
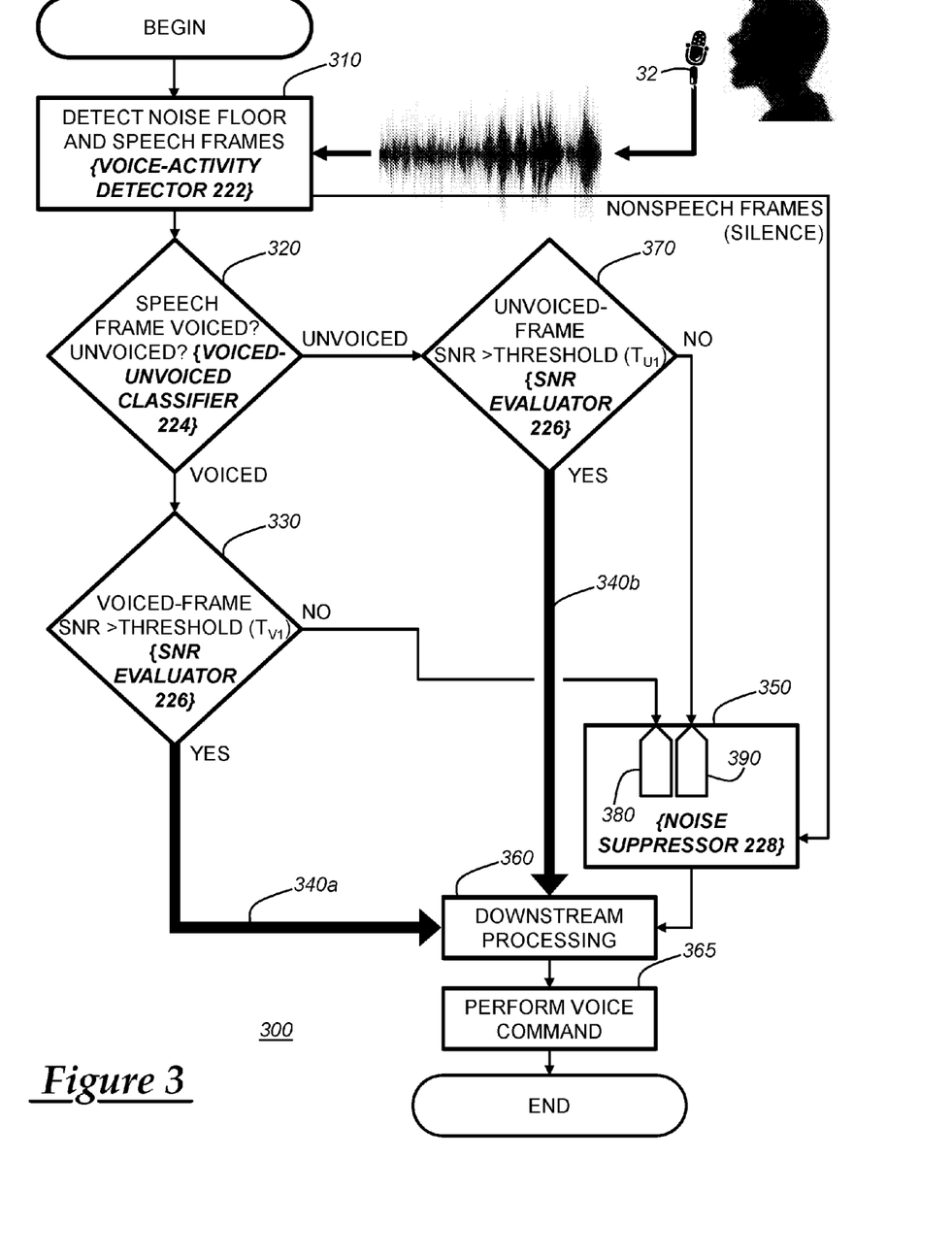
FIG. 3 is a flow diagram illustrating one embodiment of processing speech using the ASR engine.

Now turning to FIG. 3, the diagram illustrates one method 300 of preprocessing speech in the preprocessing stage 210 of the ASR engine 96. Some or all of the steps may be performed using processor 52 of the telematics unit 30. The method begins with step 310 where the voice-activity detector 222 detects a noise floor and multiple speech frames (voiced, unvoiced) associated with a user's utterance from among other audio frames (e.g., nonspeech frames). The speech frames may be provided to the voiced-unvoiced classifier 224 (step 320). And the nonspeech frames may be provided directly to the noise suppressor in step 350; alternatively, the nonspeech frames may be provided directly to the downstream processing step 360. Both steps 350 and 360 are discussed in greater detail below. After step 310, the method proceeds to step 320.

In step 320, the ASR engine 96—or more specifically the voiced-unvoiced classifier 224—determines for each of the speech frames whether they are voiced or unvoiced. The voiced/unvoiced determination may include pitch and/or formant analysis, or any other method known to skilled artisans. If the speech frame is determined to be unvoiced, the method 300 proceeds to step 370, and if the speech frame is determined to be voiced, then the method proceeds to step 330.

Step 330 occurs at the SNR evaluator 226. For each voiced frame, a signal-to-noise (SNR) value is determined, and the SNR value is compared to (or against) a predetermined threshold ($T_{V1}$) that may be stored in memory 54. If the SNR value is greater than threshold $T_{V1}$, the voiced-frame bypasses (340a) the noise suppressor 228; i.e., the voiced-frame is provided to the downstream processing step 360 without noise suppression (i.e., provided to the downstream processing stage 220). However, if the SNR value is less than or equal to the threshold $T_{V1}$, the voiced-frame is provided to the noise suppressing step 350 before it is downstream processed (i.e., provided first to the noise suppressor 228).

Turning to step 360, here audio frames are processed using one or more of the various downstream processing techniques previously described (e.g., feature extraction, classification, combination, decoding) in order to interpret the user's utterance.

After step 360, the method 300 may perform additional processing in step 365. Embodiments of step 365 are numerous and will be appreciated by skilled artisans. FIG. 3 illustrates step 365 as performing a voice command using the ASR-interpreted user's utterance. Thereafter, the method ends. Of course, the method may be repeated for each utterance received at the microphone 32.

Returning to the frames in step 330 having a SNR value less than or equal to the threshold $T_{V1}$, these frames do not bypass noise suppression. They proceed to step 350 for processing by the noise suppressor 228. Any suitable noise suppression technique, including those previously described, may be used in step 350 to remove undesirable noise from the voiced-frames. Following step 350, the method may proceed to step 360 and proceed as previously discussed.

Returning to the frames in step 320 determined to be unvoiced, these frames may be evaluated by SNR evaluator 226 as well in step 370. For each unvoiced frame, a signal-to-noise (SNR) value is determined, and the SNR value is compared to (or against) a predetermined threshold ($T_{U1}$) that may be stored in memory 54. If the SNR value is greater than threshold $T_{U1}$, the unvoiced-frame bypasses (340b) the noise suppressor 228; i.e., the unvoiced-frame is provided to the downstream processing step 360 without noise suppression (i.e., provided to the downstream processing stage 220). However, if the SNR value is less than or equal to the threshold $T_{U1}$, the unvoiced-frame is provided to the noise suppressing step 350 before it is downstream processed (i.e., provided first to the noise suppressor 228). Thereafter, the method 300 proceeds as previously described.

It should be appreciated that the SNR evaluator associated with step 370 may or may not be the same device or circuit as that used in step 330. Hence, various implementations are possible.

Figure 4:
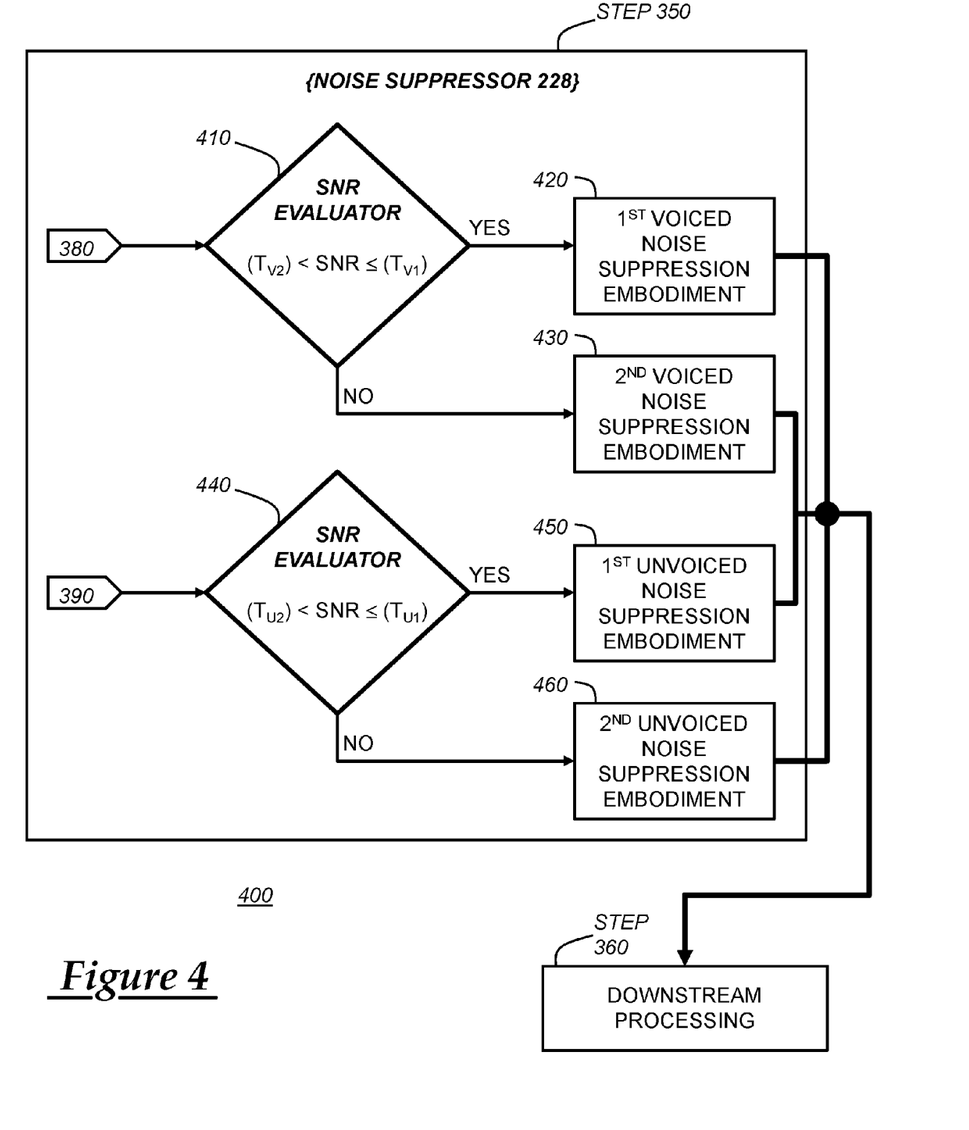
FIG. 4 is a flow diagram illustrating a noise suppression embodiment using the noise suppressor shown in FIGS. 2 and 3.

Turning to FIG. 4, an embodiment of the noise suppressing step 350 is illustrated. Step 350 may simply utilize the tools 230 previously described to all incoming audio frames; or as shown in FIG. 4, another selection or categorization process may be implemented. For example, voiced-frames (380) may undergo a secondary evaluation in step 410 (using the SNR evaluator 226). In one implementation, the SNR value for the voiced-frame (380) may be compared to a second predetermined threshold ($T_{V2}$) stored in memory 54. Voiced-frames having an SNR value less than or equal to $T_{V1}$ and greater than $T_{V2}$ may proceed to step 420—a first voiced noise suppression embodiment. And voiced-frames having an SNR value less than or equal to $T_{V2}$ may proceed to step 430—a second voiced noise suppression embodiment. The first and second voiced noise suppression embodiments may vary in degree or level of noise suppression; e.g., the second embodiment may apply a more noise suppression than the first. Thus when FIGS. 3 and 4 are considered together: some voiced-frames may bypass noise suppression (FIG. 3, step 340a), some voiced-frames may have a first degree of noise suppression (step 420), and other voiced-frames may have a second degree of noise suppression (step 430).

The predetermined SNR thresholds for voiced-frames may be any suitable values. In one embodiment, $T_{V1}$ is approximately 20 decibels (dB) and $T_{V2}$ is approximately 6 dB.

In FIG. 4, the unvoiced-frames may undergo a similar secondary evaluation in step 440 (using the SNR evaluator 226). In one implementation, the SNR value for the unvoiced-frame (390) may be compared to a second predetermined threshold ($T_{U2}$) stored in memory 54. Unvoiced-frames having an SNR value less than or equal to $T_{U1}$ and greater than $T_{U2}$ may proceed to step 450—a first unvoiced noise suppression embodiment. And unvoiced-frames having an SNR value less than or equal to $T_{U2}$ may proceed to step 460—a second unvoiced noise suppression embodiment. The first and second unvoiced noise suppression embodiments may vary in degree or level of noise suppression as well; e.g., again, the second embodiment may apply a more noise suppression than the first. Thus when FIGS. 3 and 4 are considered together: some unvoiced-frames may bypass noise suppression (FIG. 3, step 340b), some unvoiced-frames may have a first degree of noise suppression (step 450), and other unvoiced-frames may have a second degree of noise suppression (step 460).

The predetermined SNR thresholds for unvoiced-frames again may be any suitable values. In one embodiment, $T_{U1}$ is approximately 20 decibels (dB) and $T_{U2}$ is approximately 6 dB.

FIG. 4 illustrates that regardless of what noise suppression embodiment is applied (steps 420, 430, 450, 460), the process still proceeds to the downstream processing step 360 (consistent with FIG. 3). In addition, while speech frames were illustrated in FIG. 4, this should not be considered a limitation; e.g., nonspeech frames may be similarly processed. In addition, while two voiced and two unvoiced noise suppression embodiments were disclosed, this is merely an example. Three, four, etc. suppression embodiments also are possible.

Figure 5:
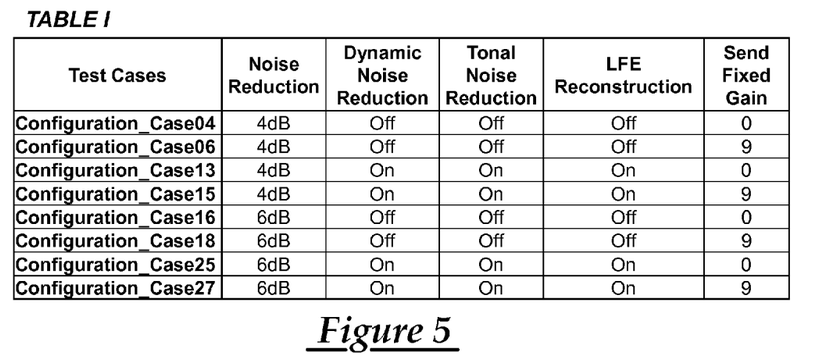
FIGS. 5-7 are tables of actual data illustrating an increase in ASR accuracy when processing speech using the ASR engine configured as described herein.
Figure 6:
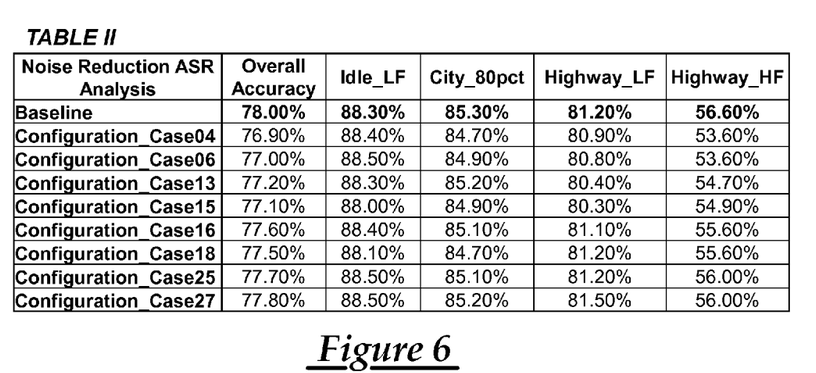
Figure 7:
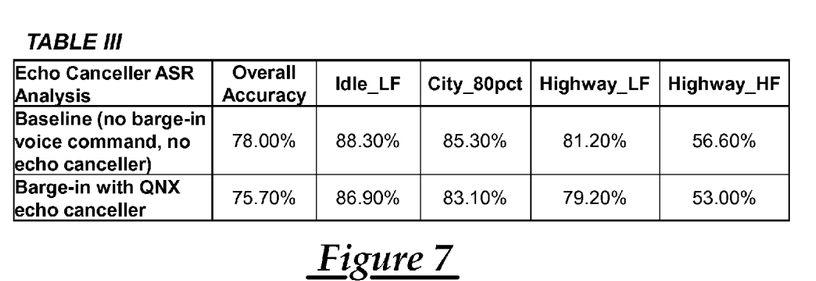

Turning to FIGS. 5-7, these figures illustrate Tables I, II, and II providing actual data demonstrating an overall improvement in overall ASR accuracy when noise suppression is bypassed or avoided on selective speech frames—more specifically, on voiced-frames having a SNR value greater than the first predetermined threshold ($T_{V1}$)—see FIG. 3, step 340a. FIG. 5 illustrates a test case column (listing variable-case configurations), a Noise Reduction (NR) column, a Dynamic Noise Reduction (DNR) column, a Tonal Noise Reduction (NR) column, an LFE (Low Frequency Estimator) Reconstruction column, and a Send Fixed Gain column. In general, FIG. 5 provides at least some of the key parameters used in obtaining the results shown in FIGS. 6 and 7.

FIG. 6 illustrates a QNX Noise Reduction (NR) Automatic Speech Recognition (ASR) Analysis column (listing variable-case configurations and a baseline or control-case configuration), an Overall Accuracy column, an Idle_LF column (driving with engine idle, low frequency noise), a City_80 pct column (driving in 80% city noise), a Highway_LF column (highway driving noise, low frequency), and a Highway_HF column (highway driving noise, high frequency). The variable-case configurations are combined (e.g., a mean value, an average value, etc.) in FIG. 7.

FIG. 7 illustrates a comparison of the baseline configuration against the variable-case configurations. The baseline configuration includes no echo cancellation of the voiced-frame(s) having the SNR value greater than $T_{V1}$. The variable-case combination does include echo cancellation of the voiced-frame(s) having the SNR value greater than $T_{V1}$. FIG. 7 illustrates the overall accuracy of the baseline configuration to be higher than the overall accuracy of the variable-case configurations—demonstrating ASR improvement when speech frames are selectively noise suppressed.

Thus, there has been disclosed an automatic speech recognition engine that selectively suppresses noise to speech frames during a preprocessing stage. Noise suppression may be bypassed when the signal-to-noise ratio (SNR) of the speech frame exceeds a predetermined threshold. These speech frames may be voiced-frames; and in some instances, the speech frames also may include unvoiced frames. Further, in some embodiments, the degree of noise suppression may vary depending on the quality of the speech frame (e.g., its SNR). By selectively suppressing noise during the pre-processing stage, ASR accuracy improves as undesirable tones are not introduced into a downstream processing stage.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of processing an audio signal using an automated speech recognition (ASR) module that uses a digital memory device and an electronic processing device to execute software stored in the memory device, the method comprising carrying out the following steps by the ASR module using the electronic processing device and digital memory device:

detecting a plurality of speech frames included in the audio signal, wherein the plurality of speech frames includes a plurality of voiced-frames and a plurality of unvoiced-frames, and wherein the audio signal is generated based on audio waves received at a microphone;

identifying the plurality of voiced-frames of the audio signal;

determining that one or more of the plurality of voiced-frames have a signal-to-noise (SNR) value greater than a first predetermined threshold;

based on the determination, bypassing noise suppression for the one or more of the plurality of voiced-frames;

identifying the plurality of unvoiced-frames of the audio signal;

determining that one or more of the plurality of unvoiced-frames has an SNR value greater than a second predetermined threshold; and based on the determination, bypassing noise suppression for the one or more of the plurality of unvoiced-frames; and thereafter performing downstream processing of the one or more of the plurality of voiced-frames and the one or more of the plurality of unvoiced-frames.

2. The method of claim 1, further comprising: performing noise suppression for the plurality of voiced-frames having an SNR less than or equal to the first predetermined threshold and for the plurality of unvoiced-frames having an SNR less than or equal to the second predetermined threshold.

3. The method of claim 1, wherein the first predetermined threshold is the same as the second predetermined threshold.

4. The method of claim 1, wherein performing downstream processing includes a feature extracting sub-stage, a classifying sub-stage, a combining sub-stage, and a decoding sub-stage.

5. The method of claim 3, wherein the first predetermined threshold is 20 dB.

6. A method of processing an audio signal using an automated speech recognition (ASR) module that uses a digital memory device and an electronic processing device to execute software stored in the memory device, the method comprising
carrying out the following steps by the ASR module using the electronic processing device and digital memory device:
identifying a plurality of speech-dominant frames from an audio signal received by the ASR module, wherein the audio signal is generated by a microphone based on received audio waves;
classifying the plurality of speech-dominant frames into voiced-frames and unvoiced-frames;
for each of the voiced-frames, determining whether the voiced-frame's signal-to-noise ratio (SNR) is greater than a predetermined threshold ($T_{V1}$);
for each of the voiced-frames having an SNR greater than the predetermined threshold ($T_{V1}$), providing the voiced-frames for downstream processing without noise suppression, and for each of the voiced-frames having an SNR less than or equal to the predetermined threshold ($T_{V1}$), providing the voiced-frames for downstream processing after performing preprocessing noise suppression on the voiced-frames;
for each of the unvoiced frames, determining whether the unvoiced frame's SNR is greater than a second predetermined threshold ($T_{U1}$); and
based on the determination, bypassing noise suppression for the one or more of the plurality of unvoiced-frames; and thereafter
performing downstream processing of the one or more of the plurality of voiced-frames and the one or more of the plurality of unvoiced-frames.

7. The method of claim 6, further comprising:
for each of the voiced-frames having the SNR less than or equal to the predetermined threshold ($T_{V1}$), classifying the SNR into one or more SNR categories, wherein the one or more SNR categories are associated with a strength of the SNR of the respective voiced-frame; and
suppressing noise for each of the respective voiced-frames according to one of the one or more SNR categories.

8. The method of claim 7, wherein the predetermined threshold ($T_{V1}$) is 20 decibels (dB).

9. The method of claim 8, wherein the one or more SNR categories includes: a first SNR category of SNR>20 dB and a second SNR category of 6 dB<SNR≤20 dB.

10. The method of claim 6, further comprising:
for each of the unvoiced-frames, determining whether the unvoiced-frame's signal-to-noise ratio (SNR) is greater than a predetermined threshold ($T_{U1}$); and
for each of the unvoiced-frames having an SNR greater than the predetermined threshold ($T_{U1}$), providing the unvoiced-frames for downstream processing without noise suppression, and for each of the unvoiced-frames having an SNR less than or equal to the predetermined threshold ($T_{U1}$), providing the unvoiced-frames for downstream processing after performing preprocessing noise suppression on the unvoiced-frames.

11. The method of claim 10, further comprising:
for each of the unvoiced-frames having the SNR less than or equal to the predetermined threshold ($T_{U1}$), classifying the SNR into one or more SNR categories, wherein the one or more SNR categories are associated with a strength of the SNR of the respective unvoiced-frame; and
suppressing noise for each of the respective unvoiced-frames according to one of the one or more SNR categories.

12. The method of claim 11, wherein the predetermined threshold ($T_{U1}$) is 20 decibels (dB).

13. The method of claim 12, wherein the one or more SNR categories includes: a first SNR category of SNR>20 dB and a second SNR category of 6 dB<SNR≤20 dB.

14. The method of claim 6, wherein the ASR module is located in a vehicle and the audio signal represents speech received by a microphone in the vehicle.

* * * * *